Patented May 9, 1933

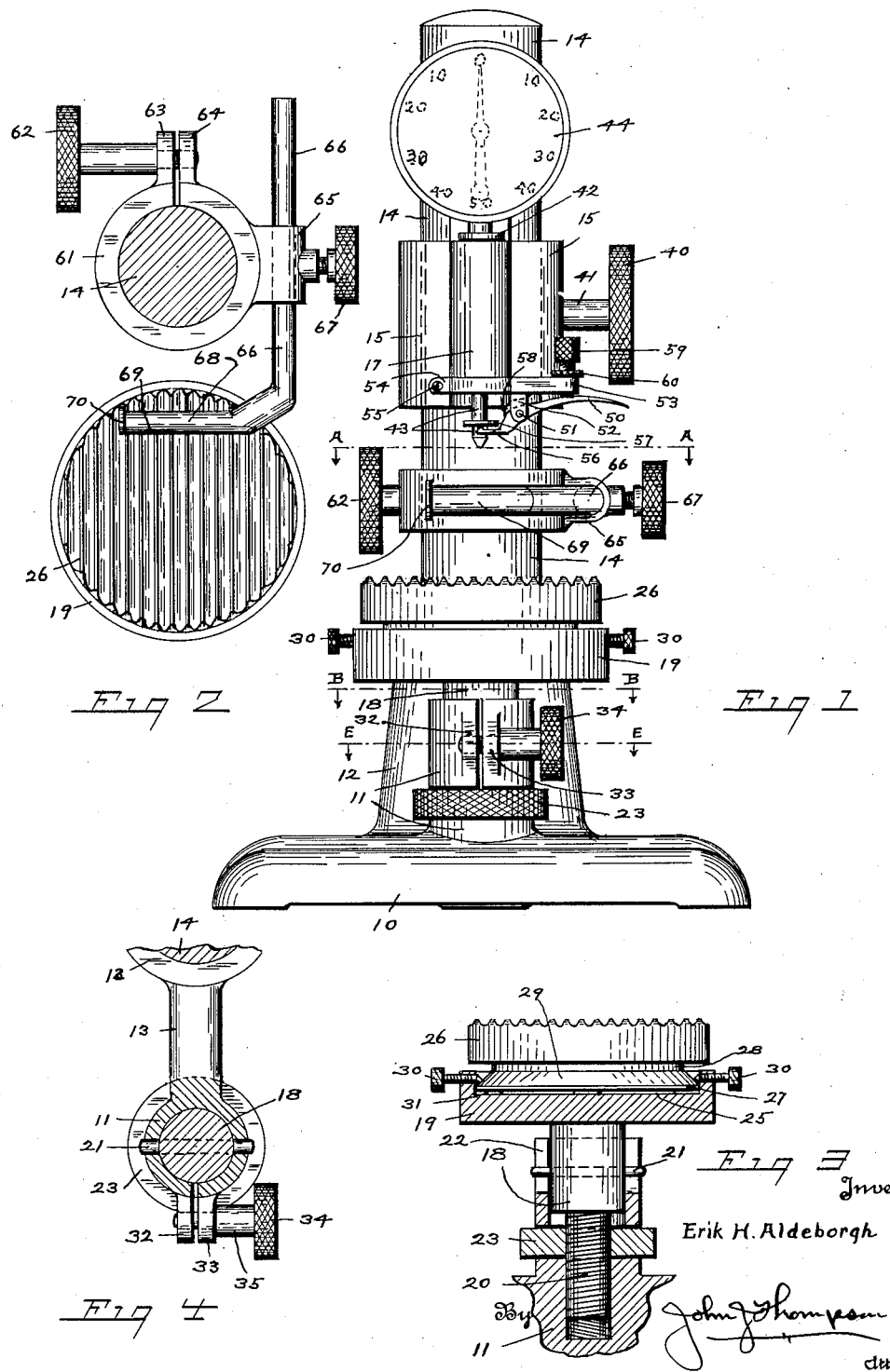

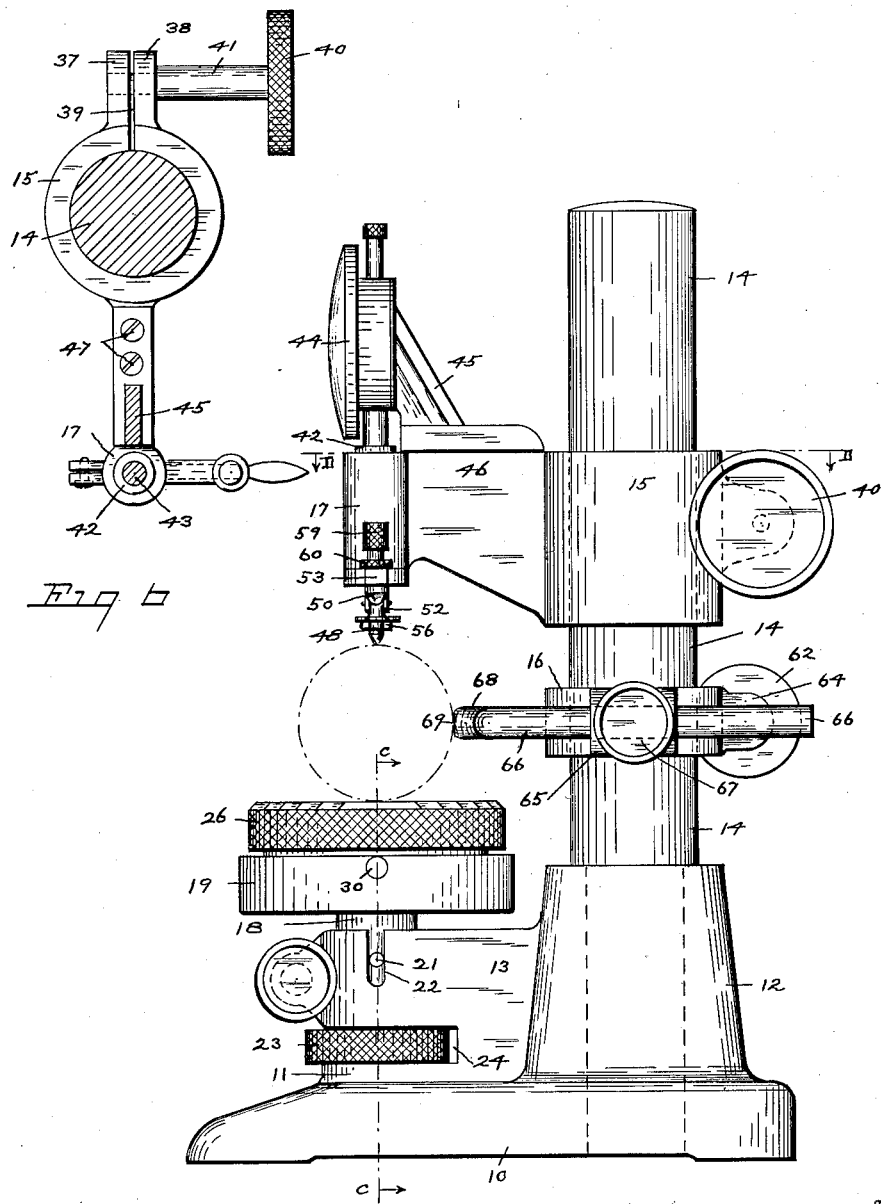

1,908,276

UNITED STATES PATENT OFFICE

ERIK H. ALDEBORGH, OF POUGHKEEPSIE, NEW YORK, ASSIGNOR TO STANDARD GAGE COMPANY, INC., OF POUGHKEEPSIE, NEW YORK, A CORPORATION OF NEW YORK

COMPARATOR GAUGE

Application filed June 30, 1931. Serial No. 547,918.

This invention relates to a gauging instrument of that class known as a comparator gauge, and which is employed in the checking of external dimensions of rounds, flats, etc., and for shoulder pieces, and to test the concentricity of diameters of parts, as well as for inspection and the testing of other gauges, and indicating chatter marks on rollers.

In such an instrument, where extreme accuracy is required the construction of the instrument must be rugged, and the surface of the work supporting table or surface plate must be practically a perfect plane and present a flat surface upon which the work is rested during the operation of checking by the dial indicator which forms a part of the instrument; and such a flat surface will tend to create adhesion between the table and a flat master reference block when setting the instrument, if such is used, and to prevent this adhesion, I have provided a surface plate which is formed with a series of serrations on its surface, the upper narrow flat surfaces of which are ground and lapped to present a practically perfect plane upon which the work rests; while due to the grooves between the serrations all microscopic particles of dust and dirt are easily eliminated to insure a perfect contact between the work and the surface of the plate; and by the particular shape of these grooves a large percent of the danger of damage caused by cracks and strains in the metal forming the surface plate are avoided, and the shape of the plate is retained for a much longer time than if the same did not have a serrated surface.

In the checking of large diameters where the center line of the piece can not be brought under the contact plunger of the dial indicator without striking the supporting column or post, it is necessary to feed the piece from side to side upon the surface plate and not in from the front as is the case with small parts, so that it is important that the surface plate or table may be rotated through 90 degrees, as the work must be placed upon the surface plate or table at right angles to the direction of the serrations, and I have therefore provided for this and for the clamping of the table in any position, and also for the interchange of tables having special arrangements of serrations and clearance spaces to take care of work having shoulders and several different diameters and shapes.

The shape of the serrations is also of great importance for the reason that the surface plate must be protected from losing its perfect plane by warping or cracking due to internal strains in the metal during manufacture or use, and to do this I have found that the grooves between the serrations should be formed with sloping sides and rounded lower corners so that all sharp corners and angles are eliminated, thus reducing the danger of strains and stresses and the forming of cracks.

It is also important in the checking of duplicate production parts where speed is required, to provide an adjustable stop to limit the introduction of the work to the proper position on the table for contact with the indicator plunger, and this I have effected by a simple adjustable stop.

The object of the invention is to provide a dimension gauge of the comparator type which can be used for the checking of rounds, flats, etc., with extreme accuracy and speed, and which will have all of the required adjustments to take a large range of sizes.

Another object is to provide a comparator gauge, in which the dial indicators may be changed, thus effecting an interchange of different dial indicators of varying sizes and calibrations.

A further object is in a comparator gauge to provide means whereby the contact plunger of the indicator may be raised for the insertion of the work under the same to prevent injury to the contact point.

Still another object being to provide means for mounting the surface plate whereby the same may be rotated in any desired position and also raised and lowered, and provided with clamping means.

Another object being to provide an adjustable stop to limit the insertion of the work upon the table to always bring it with its center line directly under the contact point, thus allowing of speed in the checking of production work.

With these and other objects in view, the following is a description of my invention, reference being had to the drawings in which the reference figures indicate the same parts in all of the views.

In the drawings:—

Figure 1 is a front elevation of the comparator gauge.

Figure 2 is a cross sectional view taken on the line A—A of Figure 1.

Figure 3 is a partial cross sectional view taken on the line C—C of Figure 5.

Figure 4 is a partial sectional view taken on the line E—E of Figure 1.

Figure 5 is a side elevation of the gauge.

Figure 6 is a partial cross sectional view taken on the line D—D of Figure 5.

Referring to the drawings, the instrument comprises a base 10 which is formed with the two bearing bosses 11 and 12 connected together by a web 13.

Within the boss 12 is secured the upright post 14, which may be of any desired height, and upon which in an adjustable manner are mounted the dial indicator supporting arm 15 and the stop retaining arm 16.

The indicator supporting arm 15 is formed with a vertical boss 17 which is alined with the center of the bearing boss 11; said boss 11 being formed with a central bore within which is mounted in an adjustable manner the stem 18 of the table support 19; said stem 18 (see Figure 3) being formed with a reduced and threaded portion 20, which is slidably mounted in the boss 11 and base 10; while the portion 18 is provided with a cross pin 21 which is capable of being raised and lowered in the slots 22 formed in the sides of the boss 11 to prevent the stem 18 from rotation, while the same is raised or lowered by a finger nut 23 threaded thereon the portion 20 and confined within a slot 24 formed in the side of the boss 11.

The table support 19 is circular and is recessed upon its upper side as at 25 to form socket for the circular surface plate or table 26 which is formed with a lower flanged portion 27 having an encircling groove 28 having an inclined face 29 with which contact the conical points of the lock screws 30 which are threaded through the wall of the support 19 and which tend not only to hold the surface plate against rotation but to exert a downward pull upon the same to retain it in close contact with the face of the support 19; the bottom of said plate 26 having three ground pads 31 upon which it rests to insure its upper surface being at right angles to the stem 18. The upper surface of the plate 26 is formed with a series of serrations, the upper edges of which are ground and lapped to a perfect plane.

For locking the stem 18 in an adjusted position, the bearing 11 is split and formed with the ears 32 and 33; the ear 32 being provided with a threaded hole for the threaded end of a locking screw 34 which has its shoulder 35 bearing against the other ear 33 for clamping the same upon the stem 18.

It will thus be seen that the surface plate 26 may be readily rotated to bring the line of its serrations in any desired direction, so that the work to be gauged may be inserted from the front, or in the case of large diameters which would be too large to be inserted from the front, these may be passed over the plate from side to side.

The indicator supporting arm 15 is formed with a pair of ears 37 and 38 and is split as at 39; the ear 37 being threaded for a locking screw 40 which has a shoulder 41 bearing against the ear 38 to clamp the arm 15 in an adjusted position upon the post 14.

The vertical boss 17 is formed with a central bore within which is mounted the tubular casing 42 of the contact plunger 43 of the dial indicator 44 which is secured by the bracket 45 to the web 46 of the arm 15 by the screws 47; this dial indicator being interchangeable with other forms and sizes of dial indicators.

For temporarily raising the contact point 48 during the placing of the work under it, there is provided a finger lever 50 which is pivoted as at 51 between the ears 52 formed on arm 53 which is secured upon the lower end of the tubular casing 42 below the boss 17 by a pair of ears 54 which are split and secured together by a screw 55; the inner end of the finger lever 50 being in the form of a yoke 56 embracing the plunger 43 and bearing against a flange 57 thereon in such a manner that as the finger lever 50 is pressed down the plunger will be raised; said finger lever being normally held up by a spring 58, and its movement being limited by an adjusting screw 59 and locked by a jam nut 60 threaded thereon.

For the purpose of locating the center of the work as in round pieces directly under the gauging point and to render the operation of gauging simply and quick by inserting the work on the surface plate against a stop, there is provided an adjustable stop located between the table and the gauging point, and comprising a split member 61 which is slidably and rotatably mounted on the post 14 and retained in position by a lock screw 62 threaded into one of a pair of ears 63 and 64 formed on said member; while at right angles thereto is formed a boss 65 within which is adjustably mounted a stop arm 66 which is held by a set screw 67 and formed with a bent portion 68 having its face flatted as at 69 and its outer end provided with a fiber or rubber bumper 70, so that should the arm drop upon the table no mark will be made.

This member 61 also serves to prevent the gauging point from coming into contact with the table should the arm 15 be accidently dropped during its adjustment.

In the operation of the instrument, the arm 15 is first brought to approximately the required distance from the table; a test block of the required size is then placed on the table directly under the contact point and the table raised until the contact point contacts with the gauge block and the dial is at the proper reading, and the face of the dial set to the desired reading; the arm 15 and the stem 18 are then both locked, a piece of work inserted on the table and the stop arm brought into position and locked, when the instrument is now ready for use.

Having thus described my invention, what I claim as new and desire to secure by Letters Patents, is:—

1. A comparator gauge comprising a base, a supporting post secured thereto, an indicator supporting arm adjustably mounted on said post, a dial indicator carried by said arm in a detachable manner, a work supporting table adjustably mounted in said base for movement in a direction parallel to the post, said table being formed with a recessed top, a surface plate mounted within said recess and adapted to be rotated therein, and means for locking the same against said rotation and drawing the same to said table.

2. A comparator gauge, comprising a base, a vertical supporting post mounted therein, a dial indicator supporting arm adjustably mounted upon said post and means for clamping the same thereon, a dial indicator detachably mounted upon said arm and having a contact plunger projecting from the lower face of said arm, a work supporting table having a recessed top and adjustably mounted in said base and in alined relation with the contact plunger, means for raising and lowering said table and locking means therefor, a removable surface plate formed with a gauging surface and rotably mounted within the recess in said table, an adjustable work stop mounted on said supporting post between the dial indicator arm and the surface plate, a stop arm carried thereby and adapted to be brought into contact with the work to centralize the same with respect to the contact plunger.

In testimony whereof I affix my signature.

ERIK H. ALDEBORGH.